United States Patent
Chabanne et al.

(10) Patent No.: US 9,984,220 B2
(45) Date of Patent: May 29, 2018

(54) METHOD OF AUTHENTICATING A USER HOLDING A BIOMETRIC CERTIFICATE

(71) Applicant: MORPHO, Issy les Moulineaux (FR)

(72) Inventors: Herve Chabanne, Issy les Moulineaux (FR); Julien Bringer, Issy les Moulineaux (FR); Olivier Cipiere, Issy les Moulineaux (FR); Rodolphe Hugel, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 19 days.

(21) Appl. No.: 14/924,452

(22) Filed: Oct. 27, 2015

(65) Prior Publication Data

US 2016/0117492 A1 Apr. 28, 2016

(30) Foreign Application Priority Data

Oct. 28, 2014 (FR) ...................................... 14 60347

(51) Int. Cl.
*G06F 21/32* (2013.01)
*G06F 21/33* (2013.01)
(Continued)

(52) U.S. Cl.
CPC .............. *G06F 21/32* (2013.01); *G06F 21/33* (2013.01); *G06F 21/45* (2013.01); *G06F 21/602* (2013.01); *H04L 9/3231* (2013.01); *H04L 9/3268* (2013.01)

(58) Field of Classification Search
None
See application file for complete search history.

(56) References Cited

U.S. PATENT DOCUMENTS

| 8,826,008 B2 * | 9/2014 | Brown ................ G06F 21/6263 713/156 |
| 2002/0124176 A1 * | 9/2002 | Epstein ................ G06Q 20/341 713/186 |

(Continued)

FOREIGN PATENT DOCUMENTS

| EP | 1237327 | 9/2002 |
| WO | WO-2006008395 | 1/2006 |

(Continued)

OTHER PUBLICATIONS

French Search Report, dated Jul. 16, 2015, French Application No. 1460347.

*Primary Examiner* — Malcolm Cribbs
(74) *Attorney, Agent, or Firm* — Womble Bond Dickinson (US) LLP

(57) ABSTRACT

The present invention concerns a method of generating a biometric certificate of a user performed by a data processing device of a certifying authority, comprising a step of generating (E4) a certificate for said user comprising data related to the identity of the user and truncated authentication data of said user generated using a method of generating a biometric authentication datum, comprising steps of:
  acquiring (E1) first biometric data of said user;
  generating (E2) a first a proof of knowledge of said first biometric data from the first acquired biometric data and from a pseudo-random function;
  generating (E3) a first truncated authentication datum by applying a truncation function to said first generated proof of knowledge.

12 Claims, 8 Drawing Sheets

(51) Int. Cl.
*G06F 21/45* (2013.01)
*G06F 21/60* (2013.01)
*H04L 9/32* (2006.01)

(56) References Cited

U.S. PATENT DOCUMENTS

| | | | | |
|---|---|---|---|---|
| 2003/0076961 A1* | 4/2003 | Kim | ................... | H04L 9/006 380/282 |
| 2003/0076962 A1* | 4/2003 | Roh | ................... | H04L 9/006 380/282 |
| 2003/0115475 A1* | 6/2003 | Russo | ............... | G06K 9/00026 713/186 |
| 2004/0054913 A1* | 3/2004 | West | ................... | G06F 21/64 713/186 |
| 2004/0059924 A1* | 3/2004 | Soto | ................... | G06F 21/32 713/186 |
| 2004/0162984 A1* | 8/2004 | Freeman | ............. | G06Q 20/341 713/175 |
| 2004/0236694 A1* | 11/2004 | Tattan | ................... | G06F 21/32 705/50 |
| 2007/0094509 A1* | 4/2007 | Wei | ................... | G06F 21/42 713/176 |
| 2009/0222659 A1* | 9/2009 | Miyabayashi | ...... | H04L 63/0823 713/156 |
| 2010/0023771 A1* | 1/2010 | Struik | ................... | H04L 9/002 713/171 |
| 2010/0242102 A1* | 9/2010 | Cross | ................... | G06F 21/32 726/7 |
| 2010/0306550 A1 | 12/2010 | Kevenaar et al. | | |
| 2010/0332838 A1* | 12/2010 | Zhu | ................... | H04L 9/3231 713/175 |
| 2011/0022835 A1* | 1/2011 | Schibuk | ............... | G06Q 20/382 713/153 |
| 2011/0055585 A1* | 3/2011 | Lee | ................... | H04L 9/0844 713/183 |
| 2013/0174243 A1* | 7/2013 | Inatomi | ............... | H04L 9/3231 726/7 |
| 2013/0267202 A1* | 10/2013 | Palanigounder | .... | H04L 12/1868 455/411 |
| 2013/0283035 A1* | 10/2013 | Tomlinson | ........... | H04L 9/3231 713/150 |
| 2013/0318354 A1* | 11/2013 | Entschew | ........... | G06F 21/645 713/175 |
| 2014/0095884 A1* | 4/2014 | Kannavara | ........... | G06F 21/32 713/186 |
| 2016/0094348 A1* | 3/2016 | Takahashi | ........... | H04L 9/0866 713/175 |
| 2017/0251062 A1* | 8/2017 | Lu | ................... | H04L 67/141 |

FOREIGN PATENT DOCUMENTS

| | | |
|---|---|---|
| WO | WO-2007036763 | 4/2007 |
| WO | WO-2008106336 | 9/2008 |

* cited by examiner

METHOD OF AUTHENTICATING A USER HOLDING A BIOMETRIC CERTIFICATE

GENERAL TECHNICAL FIELD

The present invention relates to the field of identity certification. More specifically, it concerns an authentication method which uses a digital certificate comprising a biometric authentication datum.

STATE OF THE ART

Numerous administrative or bank procedures in everyday life require proof of identity. For this purpose everyone holds various identity documents such as an identity card or passport. For valid proof of the identity of the holder such documents are only issued after an administrative procedure for which the applicant must justify his or her identity by means of numerous documents such as an act of birth. It is nevertheless possible for a forger to steal the identity of a victim by falsifying an identity document or else by illegally appropriating the identity of the victim during issuing procedure.

To prevent such identity theft, it is possible to authenticate a person no longer on the base of an identity document but on a biometric datum which is more difficult to falsify or forge. For example, some controls for entry to restricted access areas use biometric authentication on the basis of an iris pattern, fingerprint or DNA profile. For such authentication, it is much more difficult to steal another person's identity. Nonetheless, such authentication requires the holding of a database which stores in memory the biometric data of all users to be authenticated. Such database may give rise to problems with regard to heed of privacy of those persons whose biometric data are held in the memory of a database. Such data could effectively be used to identify these persons without his/her knowledge. In addition, particularly with regard to DNA profiles, such data could be used to infer information on these persons such as their ethnic origin, the probability that they may develop some diseases etc.

There is therefore a need for an authentication method with which it is possible to authenticate a person in reliable manner without it being possible that the data stored in memory to apply this method could be used to identify a person without his/her knowledge or to infer information on this person.

DISCLOSURE OF THE INVENTION

According to a first aspect, the invention concerns a method of generating a biometric certificate of a user performed by a data processing device of a certifying authority, characterized in that it comprises a step of generating a certificate for said user comprising data related to the identity of the user and truncated authentication data on said user generated by a method of generating a biometric authentication datum, said method of generating a biometric authentication datum comprising steps of:
  acquiring first biometric data of said user;
  generating a first proof of knowledge of said first biometric data from the first acquired biometric data and from a pseudo-random function;
  generating a first truncated authentication datum by applying a truncation function to said first generated proof of knowledge.

Such a certificate enables the holder thereof to provide proof of his/her identity for example for administrative or legal procedures. The truncated data allow user authentication with reduced rate of error but do not allow identification of the user.

Said method of generating a biometric authentication datum, for at least one error to be processed among a determined set of tolerable errors, may further comprise:
  a step of generating first derived biometric data by adding said error to the first acquired biometric data;
  a step of generating first derived proofs of knowledge from the first generated derived biometric data and from said pseudo-random function; and
  a step of generating first derived truncated authentication data by applying said truncation function to said first generated derived proofs of knowledge.

This makes it possible to take into account some errors considered to be tolerable which may occur during implementing of the method, and to avoid rejection of an authentication request by an authentic user despite the occurrence of such an error. The taking into account of these errors upstream of the authentication procedure allows easing of the authentication process subsequently applied.

The data processing device of the certifying authority holding a secret encrypting key, the step of generating the certificate for said user may comprise a step of encrypting the truncated authentication data of said user.

Said encrypting can prevent unlawful use of a certificate since the use thereof then requires the active participation of the certifying authority.

According to a second aspect, the invention concerns a method of authenticating a user holding a biometric certificate generated in accordance with the certificate generating method according to the first aspect, said authentication method comprising steps of:
  acquiring second biometric data of said user to be authenticated;
  generating a second proof of knowledge of said second biometric data from the second acquired biometric data and from said pseudo-random function;
  generating a second truncated authentication datum by applying said truncation function to said second generated proof of knowledge;
  acquiring the first truncated authentication datum or a first derived truncated authentication datum stored in the certificate;
  comparing the first truncated authentication datum or the first derived truncated authentication datum with said second truncated authentication datum.

With such an authentication method it is possible properly to authenticate the holder of a certificate via the user's biometric data without this data being stored, thereby improving heed of the privacy of this holder.

Said method according to the second aspect may further comprise:
  for at least one tolerable error to be tested among a determined set of tolerable errors, a step of generating second derived biometric data by adding said error to the second acquired biometric data;
  for each error to be tested, a step of generating a second proof of knowledge derived from the second generated derived biometric data and from said pseudo-random function, and a step of generating a second derived truncated authentication datum by applying said truncation function to said second generated derived proof of knowledge;
  a step of acquiring a first truncated authentication datum or a first derived truncated authentication datum from said certificate;

a step of comparing the acquired first truncated authentication datum or the first derived truncated authentication datum with the second generated derived truncated authentication data.

This makes it possible to take into account some tolerable errors when conducting authentication, for example to take into account new tolerable errors not taken into account when creating the certificate.

The step of acquiring the first truncated authentication datum in the authentication method according to the second aspect for a user holding a biometric certificate generated according to the certificate generating method of the first aspect, may comprise a decrypting step using the encryption key to decrypt the first acquired encrypted truncated authentication datum.

For authentication, this allows identification of the authentication data stored in the certificate in encrypted form, thereby protecting the certificate holder against fraudulent use of this data.

According to a first embodiment of the invention, the step of generating a proof of knowledge of biometric data may comprise a step of generating a hash of the biometric data performed by applying a hashing function to the biometric data.

With said hashing, the data stored in a certificate cannot be used to access information on the medical condition or ethnic origin of the certificate holder.

The proof of knowledge can then be generated by using said hashing function and a secret hash key held solely by the certifying authority.

The use of such a secret hash key requires the participation of the certifying authority and reinforces the protection of the method against identity theft.

According to a second embodiment of the invention, the step of generating a proof of knowledge of biometric data may further comprise a step of calculating a modular exponentiation of a uniformly distributed value obtained from the biometric data and from said pseudo-random function to make access to said biometric data more difficult on account of the difficulty of calculating a discrete logarithm.

The step of generating a proof of knowledge of biometric data may then further comprise steps of:
acquiring a derivation parameter h verifying the formula: h=g^r where r is a random number, g a generator of a group of prime order p, and g and p being public data;
calculating a proof of knowledge using the formula: h^X or hash(h^X) with X being a value obtained from said biometric data and from said pseudo-random function, and hash being a hashing function.

Such an exponentiation being difficult to invert within a reasonable time, this guarantees that the biometric data of the certificate holder cannot be found using such a proof of knowledge.

According to a third embodiment of the invention, the truncation function may apply truncation to n bits, n being a function of the probability of occurrence of tolerable errors.

The judicious choice of truncation length makes it impossible to identify a person from the person's biometric data and from a certificate base whilst minimising the probability of false positives at the time of authentication, even when taking into account some tolerable errors during authentication.

According to a third aspect, the invention concerns a computer programme product comprising programme code instructions to implement the steps of the method according to the first aspect or second aspect when said programme is run on a computer.

According to a fourth aspect, the invention concerns a certification server, characterized in that it comprises a data processing device configured to implement a method of generating a user's biometric certificate according to the first aspect.

Said computer programme product and certification server have the same advantages as those indicated for the method according to the first aspect or the second aspect.

PRESENTATION OF THE FIGURES

Other characteristics and advantages of the present invention will become apparent on reading the following description of a preferred embodiment. This description is given with reference to the appended drawings in which.

DETAILED DESCRIPTION

Figure 1:
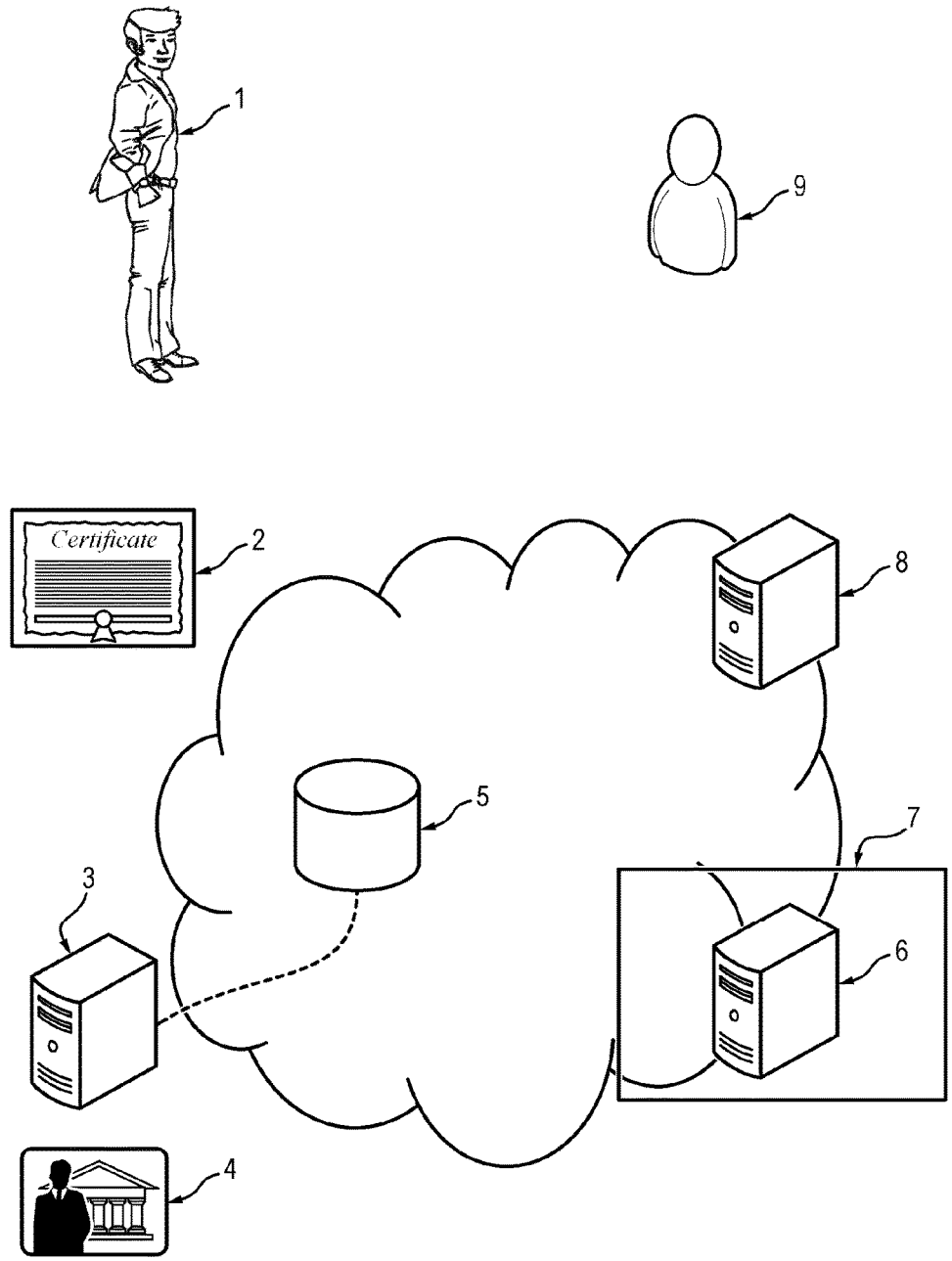
FIG. 1 illustrates an example of the architecture of an authentication system according to one embodiment of the invention.

The present invention concerns the implementing in an authentication system illustrated in FIG. 1, of a method of authenticating a user 1 holding a biometric certificate 2 generated by a data processing device 3 of a certifying authority 4 based on biometric data of said user.

As illustrated in FIG. 1, the data processing device 3 of said certifying authority 4 allowing the generation of certificates may be included in a certification server and can be connected to a database 5 used to store all or part of said certificates.

Such a generated biometric certificate allows the linking of identity attributes of the user hereinafter called user identity-related data such as name, gender, date of birth, place of birth, identity of parents . . . with a value derived from biometric data of the individual. When a certificate is generated, the certifying authority signs this certificate to validate the association in the certificate of the user identity-related data with the value derived from the person's biometric data. Each generated certificate can be kept by the holder on an identity device such as a chip card or hard copy of entry of birth e.g. by means of a two-dimensional bar code (2D barcode), and/or by the certifying authority in the database 5 for a predetermined time e.g. the user's lifetime. Such a certificate can be used by its holder for identity verification during procedures to generate other identity documents or for legal procedures, for example in the event of theft of the user's identity.

The biometric data used to generate such a certificate can be acquired by a processing device 6 of a laboratory 7. Such a laboratory is preferably a separate entity from the certifying authority 4 but may also be merged therewith. These biometric data may be of any biometric data type that is stable over time, invariable over successive acquisitions, non-intrusive and not disclosing any physical characteristic of the user. For example, said biometric data may be fingerprints, iris patterns of the user or any partial genetic profile making it possible to authenticate a person from a small amount of the person's biological tissue (hair root, blood, saliva, semen). The laboratory's processing device may therefore comprise suitable acquisition means such as an iris scanner or blood or saliva sampling device.

Figure 2:
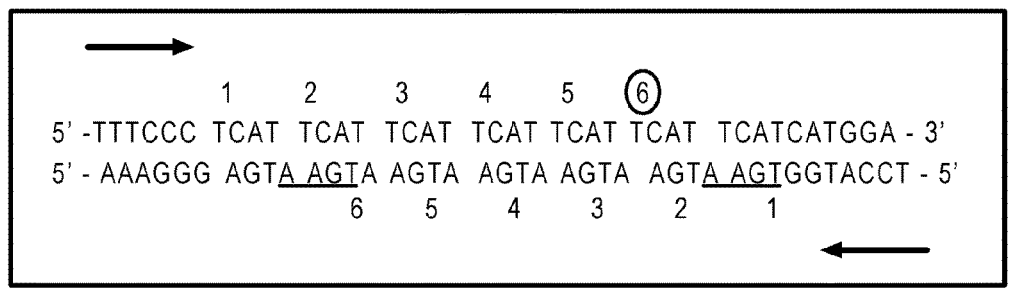
FIG. 2 illustrates a sequence of nucleotides of a user to be authenticated from which an STR DNA profile is determined.

Such biometric data may be a DNA profile extracted from biological tissues of a person, for example an STR (Short Tandem Repeats) DNA profile. Said STR DNA profiles are based on short repeated sequences of nucleotides. The acquired STR DNA profiles are located in a non-coding DNA region so that a minimum amount of information is given on the person, for example so that neither the person's physical condition, filiation or ethnic origin is disclosed. Such an STR DNA profile, for each allele of a pair of alleles in such a region, indicates the number of successive repeats of a given nucleotide sequence. An STR DNA profile for each analysed pair of alleles therefore comprises a pair of numbers. For example FIG. 2 shows a sequence of nucleotides corresponding to one allele of a person's DNA belonging to a pair of alleles. This sequence has six repeats of the "TCAT" sequence. If the other allele of this pair has five repeats of this same sequence, the person's STR DNA profile for this pair of alleles may then comprise the number pair (6, 5).

The profiles used can be generated for example from analysis of ten pairs of alleles. Such profiles then have a number of combinations allowing a discriminating power of 99.9999999% to be obtained, sufficient for definite differentiation between one individual among all other individuals on the planet.

It is nevertheless the objective of the invention to propose an authentication method enabling a person to prove his or her identity with low false positive probability but which does not allow definite identification of an individual from a biometric sample. Therefore biometric authentication data having lower discriminating power are inferred from the STR DNA profiles acquired by the laboratory 7.

For this purpose, the acquired biometric data can be processed using a pseudo-random function such as a hash function and truncated.

The application of a hash function enables not to disclose in the certificate any portion of the DNA of the person to be authenticated and to distribute the data in the entire output space of such a function. The application of truncation limits the number of possible different biometric authentication data. The certificates of several different individuals may then comprise the same biometric authentication datum thereby preventing the identification of an individual from his or her DNA profile and from the certificates stored in the database of the certifying authority. For example, by truncating the biometric data over ten bits, the biometric authentication data obtained may have 1024 values, making any identification impossible but maintaining the probability of false positive authentication below 0.1%.

The operations allowing biometric authentication data of an individual to be obtained from the first biometric data acquired by the processing device 6 of the laboratory 7 can be performed by this same processing device 6, by the processing device 3 of the certifying authority 4 or else divided between these two entities. Some of these operations can also be carried out by a processing device 8 of an entity 9 generating authentication data that is independent of the laboratory 7 and of the certifying authority 4.

Generation of a User's Biometric Authentication Datum

Figure 3:
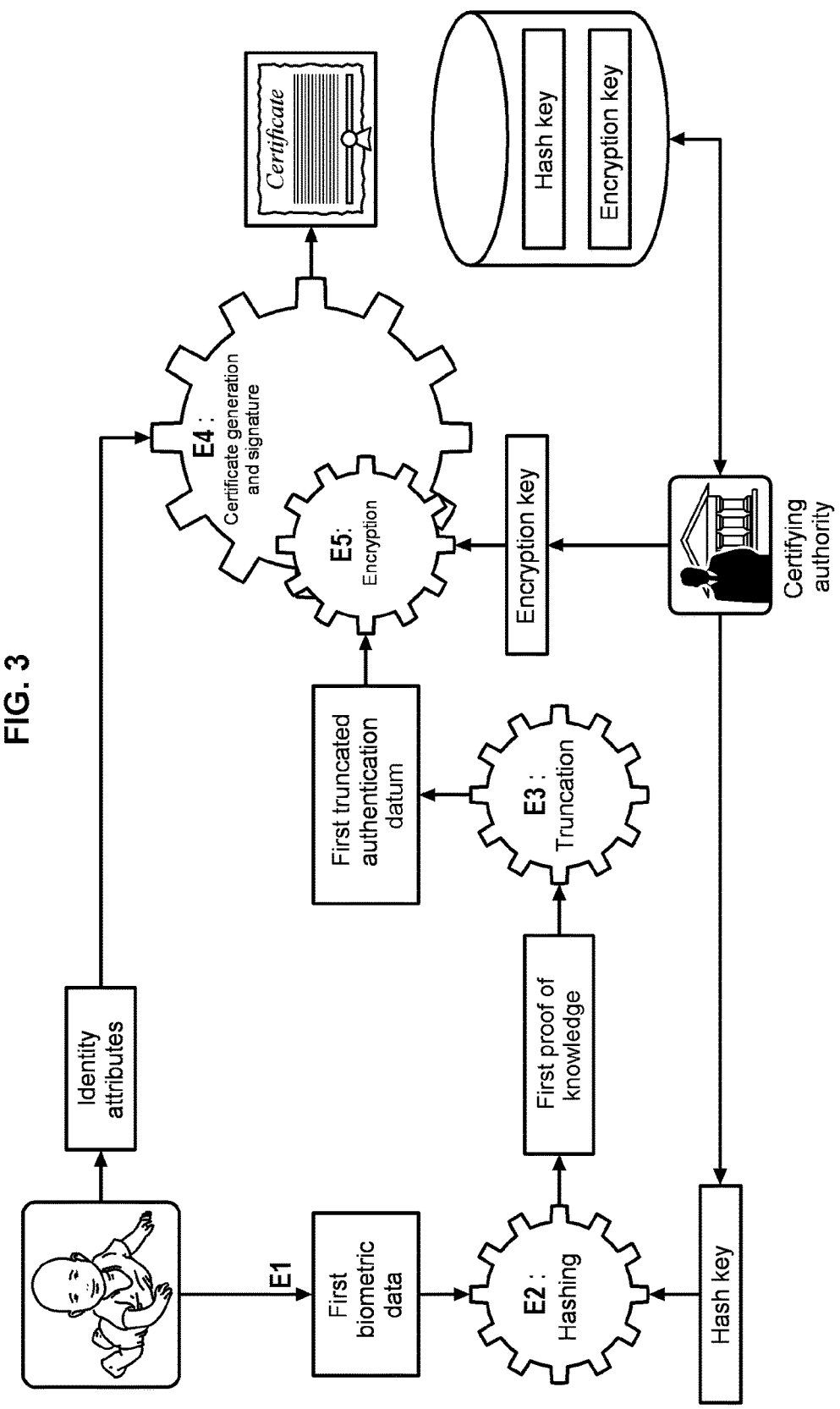
FIG. 3 is a diagram schematising a first embodiment of a method of generating a biometric authentication datum of a user and of a method of generating a biometric certificate of said user, according to the invention.

More specifically, prior to implementing the authentication method, a method of generating a user's biometric authentication datum can be carried out as illustrated in FIG. 3.

At a first acquisition step E1, first biometric data of said user is acquired by the processing device 6 of the laboratory 7. For a STR profile, these biometric data can be a set of STR DNA number pairs corresponding to the number of repeats of nucleotide sequences in analysed pairs of alleles.

From this first acquired biometric data and from a pseudo-random function, a first proof of knowledge of said biometric data is generated at a first proof generating step E2 able to be carried out by the processing device of the laboratory 7, of the entity generating authentication data 9 or of the certifying authority 4. Preferably this step is not carried out by the certifying authority to prevent the risk of fraudulent use of the individual's DNA profile in the event of compromise of the certifying authority.

Finally a truncation function is applied to said generated proof of knowledge to generate a first truncated authentication datum at a first truncating step E3 able to be carried out by the processing device of the laboratory 7, of the entity generating authentication data 9 or of the certifying authority 4.

Optionally, the first truncated authentication datum can be held by the certifying authority for use when applying a authentication method.

After the first truncating step E3, the first biometric data and the first proof of knowledge can be destroyed to prevent subsequent misuse thereof.

Taking Errors into Account

Errors may occur when determining a biometric profile, in particular at the time of acquiring biometric data, for example on account of the presence of noise in the signals used to determine a DNA profile or due to calibration problems of instruments used for chemical analysis of samples.

In general, the most frequent possible errors on a pair of values are:
- the introduction of a new value when the two values are identical: A,A→A, B,
- the deletion of a value when the two values are different: A,B→A,A,
- the shifting of the pair of values: A,B→A',B' (in fact, A,B' or A',B).

Since a STR DNA profile is composed of N pairs of values (A,B), there is generally no more than one error among the N pairs with a difference on A and B in the order of +/−1, +0.1 (or −0.9), +0.2 (−0.8), +0.3 (−0.7).

These errors must be taken into account to avoid the rejection of a legitimate request for authentication by an individual, due to a difference between the first truncated authentication datum and second truncated authentication datum generated by such an error.

Considering that the number of possible frequent errors to be taken into account amounts to 16 possible errors and that a profile may contain one of these errors positioned on any of its N pairs, 16N derived profiles can be obtained from the error-free starting profile. All these errors therefore form a determined set of tolerable errors.

Possibly, if it is known for example that the profile extraction undergoes a specific bias, other cases of error can be envisaged.

For the taking of errors into account when creating a certificate or for an authentication operation, biometric data incorporating one of the errors can be derived from the user's biometric data by adding these tolerable errors (epsilon) to the biometric data acquired at the biometric data acquisition steps.

Figure 4:
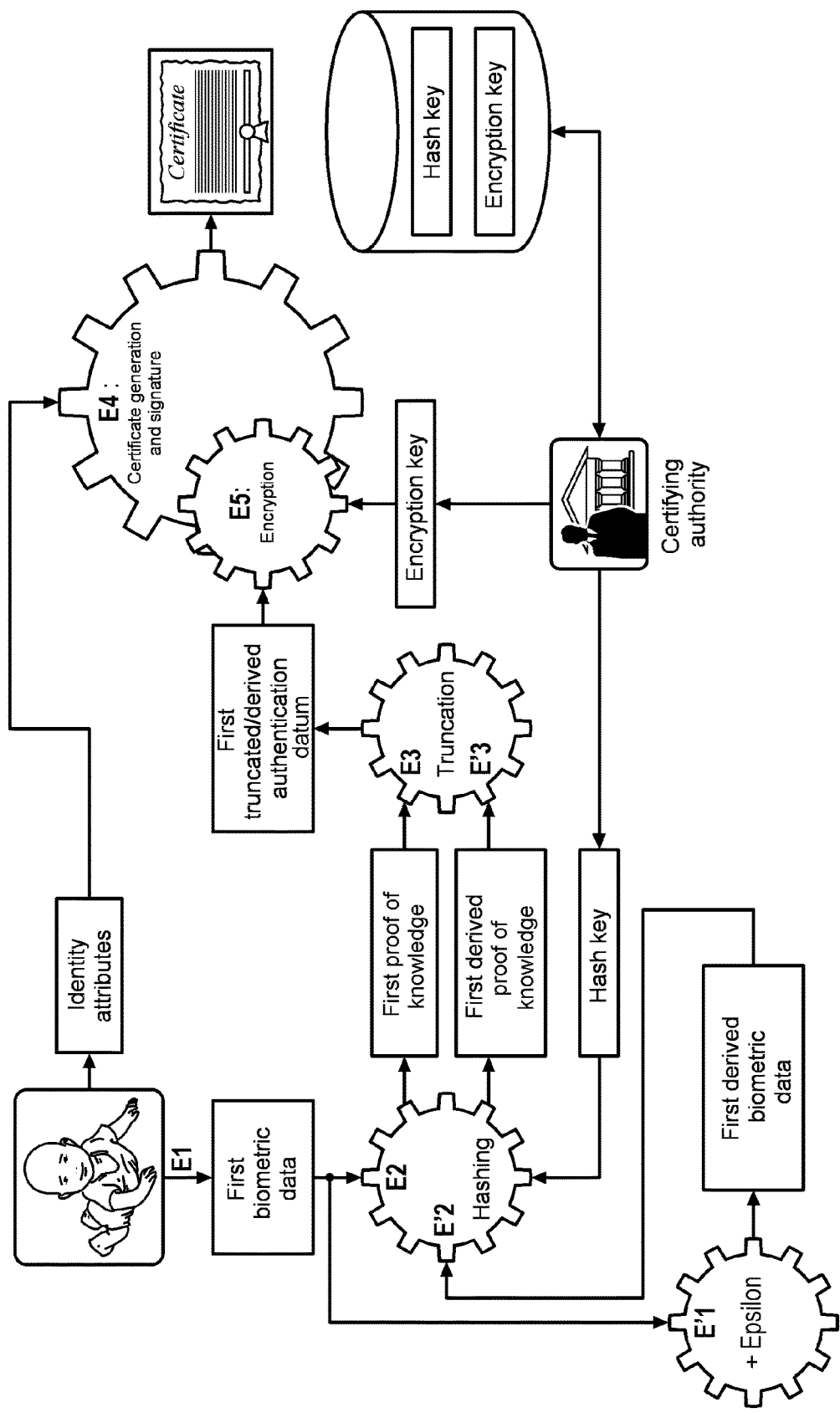
FIG. 4 is a diagram schematising a second embodiment of a method of generating a biometric authentication datum of a user and a method of generating a biometric certificate of said user according to the invention taking into account a determined set of tolerable errors.

One embodiment of the method of generating a biometric authentication datum taking some of these errors into account when creating a certificate, illustrated in FIG. 4, then further comprises, for at least one error to be processed among a determined set of tolerable errors:

a third step of generating E'1 first derived biometric data by adding said error to the first acquired biometric data;

a fourth step of generating E'2 first derived proofs of knowledge derived from the first generated derived biometric data and from said pseudo-random function; and a fifth step of generating E'3 first derived truncated authentication data by applying said truncating function to said first generated derived proofs of knowledge.

A derived truncated authentication datum item can therefore be generated for each error to be treated.

Generation of a Biometric Certificate

To generate a biometric certificate from a first truncated authentication datum obtained at the first truncating step E3, and optionally from first derived truncated biometric data obtained at the fifth step of generating E'3 first derived truncated authentication data, the data processing device 3 of the certifying authority 4 carries out a certificate generating method illustrated in FIG. 3. The biometric certificate 2 is generated at a certificate generating step E4 from user identity-related data (or identity attributes) and from the truncated authentication data obtained at the first truncating step E3 or at the fifth step of generating E'3 first derived truncated authentication data. The generated certificate is signed by the certifying authority 4.

The generated certificate 2 then comprises all the truncated authentication data and derived truncated authentication data generated at the steps of generating truncated authentication data E3 and E'3. If one of the processed tolerable errors should occur during a future authentication, the corresponding derived truncated authentication datum would be found in the certificate and would nevertheless allow authentication of the individual.

The truncated authentication data can be contained in the certificate in protected form by means of a secret encryption key held by the certifying authority. The step of generating the certificate for a user then comprises an encryption step E5 of the user's truncated authentication data. The truncated authentication data can be protected by performing an operation of XOR type between the secret encryption key and said truncated authentication data, said secret encryption key then possibly being called a mask. The truncated authentication data can be protected by encrypting with an encryption algorithm used with the encryption key of the certifying authority, such as an AES algorithm.

Such a protection of truncated authentication data enables to make this data unusable without the participation of the certifying authority 4. In addition, if the certifying authority 4 uses a different encryption key for each individual, it avoids exchange of identity between two individuals having STR DNA profiles such that the same truncated biometric identity data are obtained for these individuals from their profiles after the first truncating step E3.

Such protected truncated authentication data allowing the generation of a certificate can be held throughout the user's lifetime or else for a fixed period of time e.g. 100 years. The truncated authentication data can also be periodically protected using the most recently developed encryption protocols.

Authentication

Figure 5:
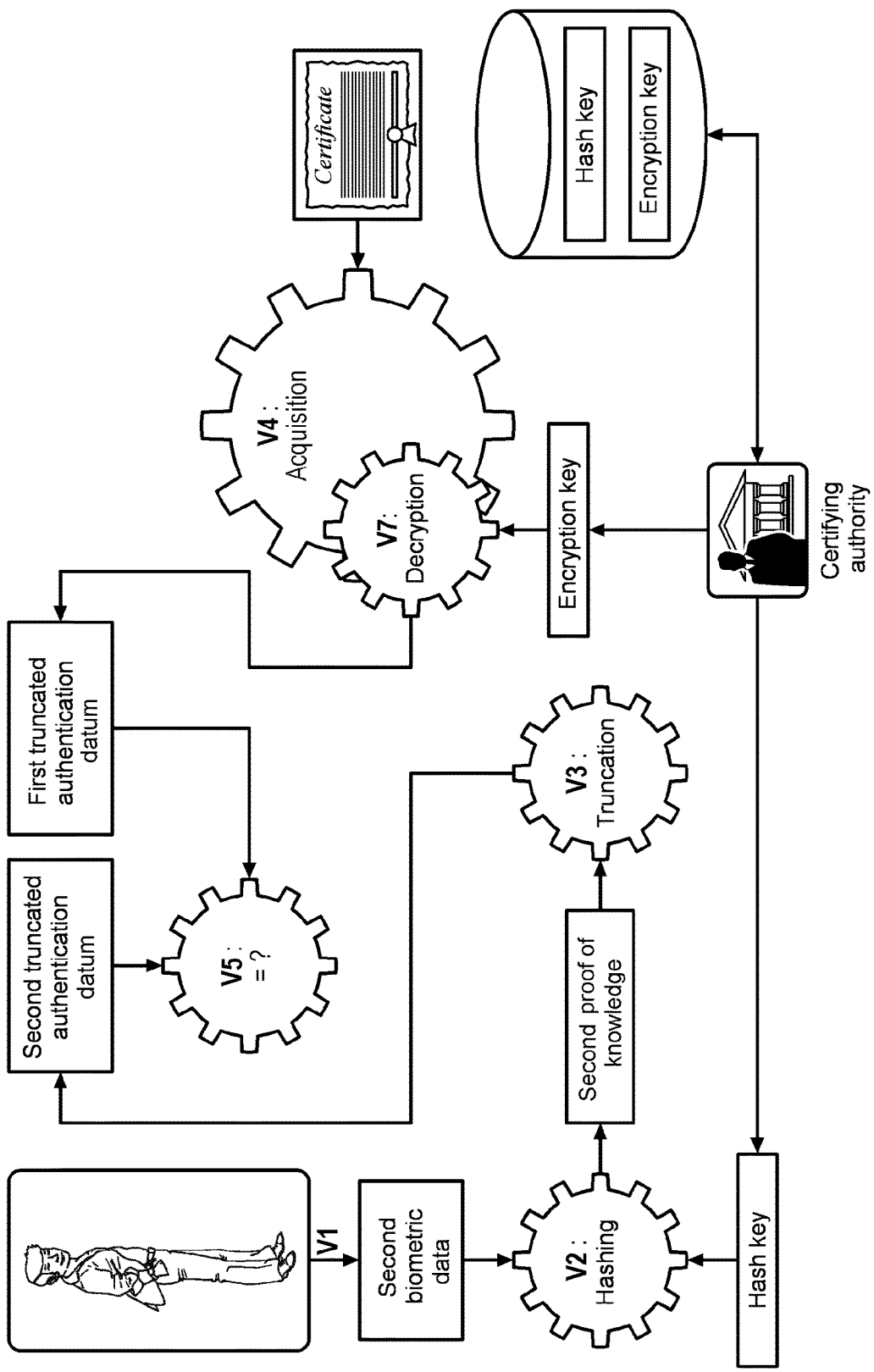
FIG. 5 is a diagram schematising a first embodiment of a method of authenticating a user holding a biometric certificate according to the invention.

After the certificate generation step E4, the user can be the holder of a biometric certificate comprising at least a first truncated authentication datum of said user. The user can then be authenticated by means of this biometric certificate by applying an authentication method illustrated in FIG. 5.

More specifically, in the same manner as for the performing of steps E1 to E3, the processing device 6 of the laboratory 7 starts by acquiring second biometric data of said user 1 to be authenticated at a second acquisition step V1.

Thereafter, a second proof of knowledge of said second biometric data is generated from the second acquired biometric data and from the pseudo-random function at a second proof generating step V2 which can be carried out by the processing device of the laboratory 7, of the entity generating authentication data 9 or of the certifying authority 4.

A second truncated authentication datum is then generated by applying the truncation function to said second proof of knowledge generated at a second truncating step V3 which can be carried out by the processing device of the laboratory 7, of the entity generating authentication data 9 or of the certifying authority 4.

To verify the identity of the individual, the first truncated authentication datum or a first derived truncated authenticated datum can be extracted from the individual's certificate at a third acquisition step V4 which can be carried out by the processing device of the laboratory 7, of the entity generating authentication data 9 or of the certifying authority 4. If the first authentication datum has been protected, the certifying authority 4 provides the secret encryption key used to protect this datum and the third acquisition step V4 may then comprise a decryption step V7 using the encryption key to decrypt the first encrypted truncated authentication datum.

Said first truncated authentication datum or the first derived truncated authentication datum and said second truncated authentication datum are then compared at a first comparison step V5. If comparison is positive, said user is then correctly authenticated.

Figure 6:
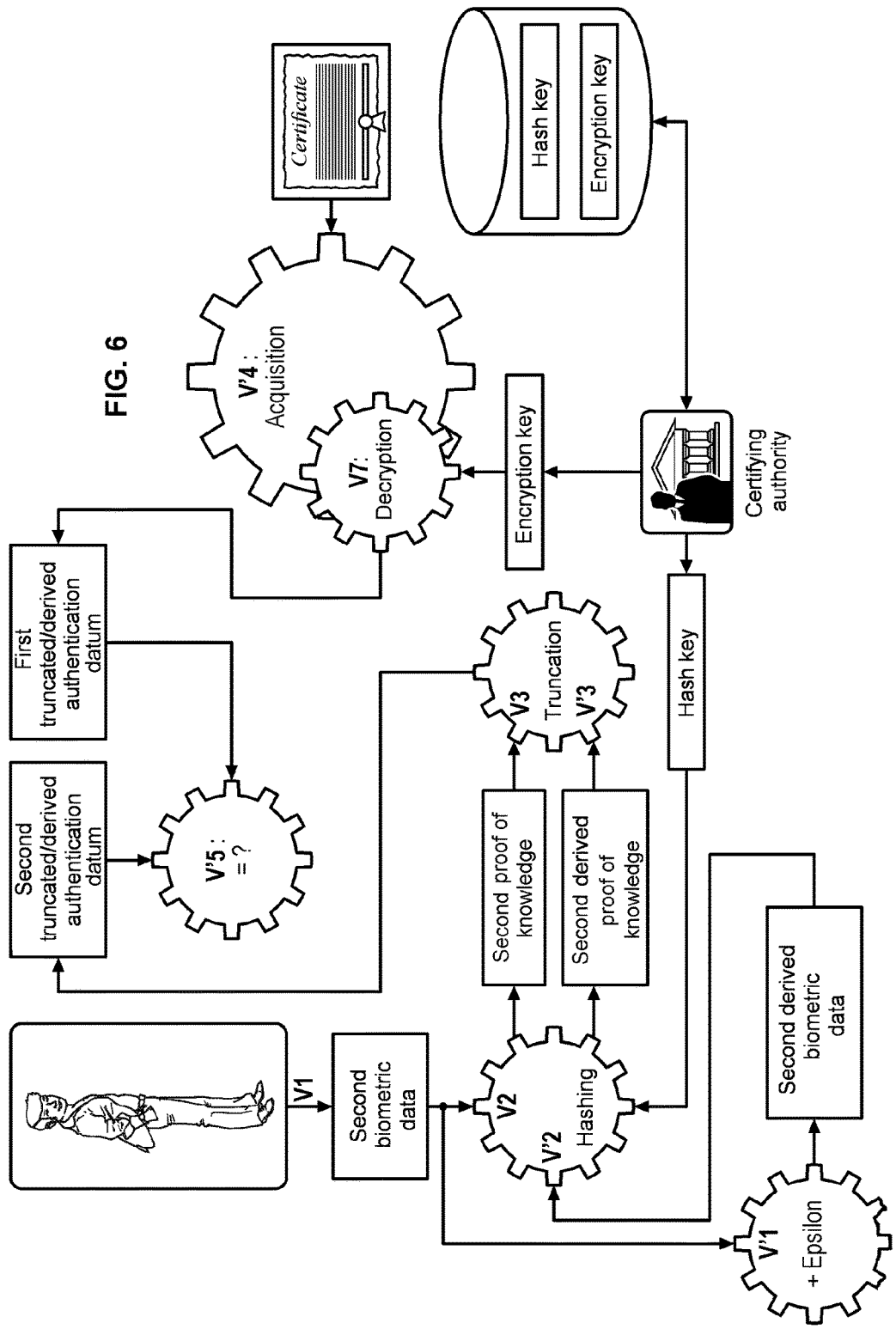
FIG. 6 is a diagram schematising a second embodiment of a method of authenticating a user holding a biometric certificate according to the invention taking into account a determined set of tolerable errors.

Some of the tolerable errors can also be taken into account when authenticating an individual. One corresponding embodiment of the method of authenticating a user 1 holding a certificate 2 illustrated in FIG. 6, then further comprises:

for at least one tolerable error to be tested among a determined set of tolerable errors, a sixth step of generating V'1 second derived biometric data by adding said error to the second acquired biometric data;

for each error to be tested, a seventh step of generating V'2 a second derived proof of knowledge from the second generated derived biometric data and from said pseudo-random function, and an eighth step of generating V'3 a second derived truncated authentication datum by applying said truncating function to said second generated derived proof of knowledge;

a fourth step of acquiring V'4 a first truncated authentication datum or a first derived truncated authentication datum obtained from said certificate;

a second step of comparing V'5 the first truncated authentication datum or the first derived truncated authentication datum acquired at acquisition step V'4 with the second derived truncated authentication data generated at the eighth generation step V'3.

If the first authentication datum has been protected, the certifying authority 4 provides the secret encryption key used to protect this datum and the fourth acquisition step V'4 may then comprise a decryption step V7 using the encryption key to decrypt the first derived or non-derived encrypted truncated authentication datum.

Most of the time only one tolerable error to be tested allows the generation of a derived truncated authentication datum identical to the first truncated authentication datum of the certificate, thereby allowing user authentication.

It is possible to combine the two above-described modes for the taking of errors into account, when creating the certificate and at the time of authentication. For example some tolerable errors can be taken into account when creating the certificate e.g. the most probable errors, and the remaining tolerable errors at the time of authentication.

If no generated truncated authentication datum is identical to the truncated authentication datum of the certificate then the user is not authenticated. It is then possible to perform new acquisitions of biometric data of the user that can be conducted by the same entity generating authentication data or by a different entity so that new comparisons can be carried out.

Embodiments of Proofs of Knowledge:

In one embodiment illustrated in FIGS. 3 to 8, the pseudo-random function used to generate the first and second proofs of knowledge at the proof generating steps E2, E'2, V2 and V'2 may be a hash function. A hash of the user's biometric data is generated by applying the hash function to the user's biometric data. With such a hash function it is possible to obtain deterministic, truncated authentication data that is non-reversible and little sensitive to collisions (i.e. having different values even if the biometric data used for the generation thereof are very close). such a hash function may be the SHA-256 algorithm allowing a vector of 256 bits to be generated as proof of knowledge.

In one variant of embodiment, the data processing device 3 of the certifying authority 4 may hold a secret hash key. A hash of the biometric data can then be generated by applying the hash function to the user's biometric data and to the secret hash key. The use of such a secret hash key allows the entropy of the generated hash to be increased. This secret hash key can be held by the certifying authority 4 and kept secret by this authority. The certifying authority may optionally provide this key to the entity in charge of applying the hash function so that this entity is able to generate proofs of knowledge.

Figure 7:
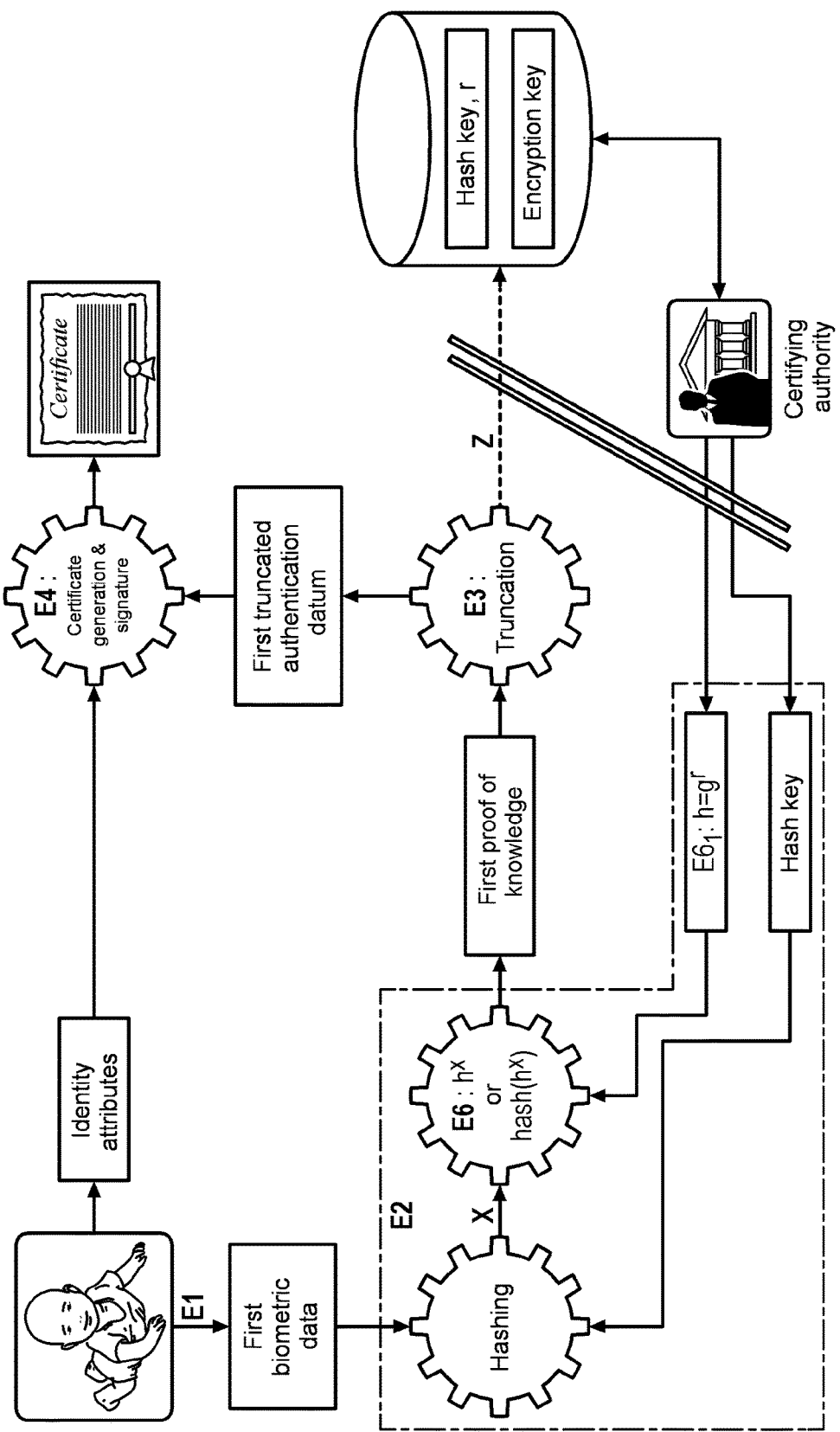
FIG. 7 is a diagram schematising a third embodiment of a method of generating a biometric authentication datum of a user and of a method of generating a biometric certificate of said user according to the invention.
Figure 8:
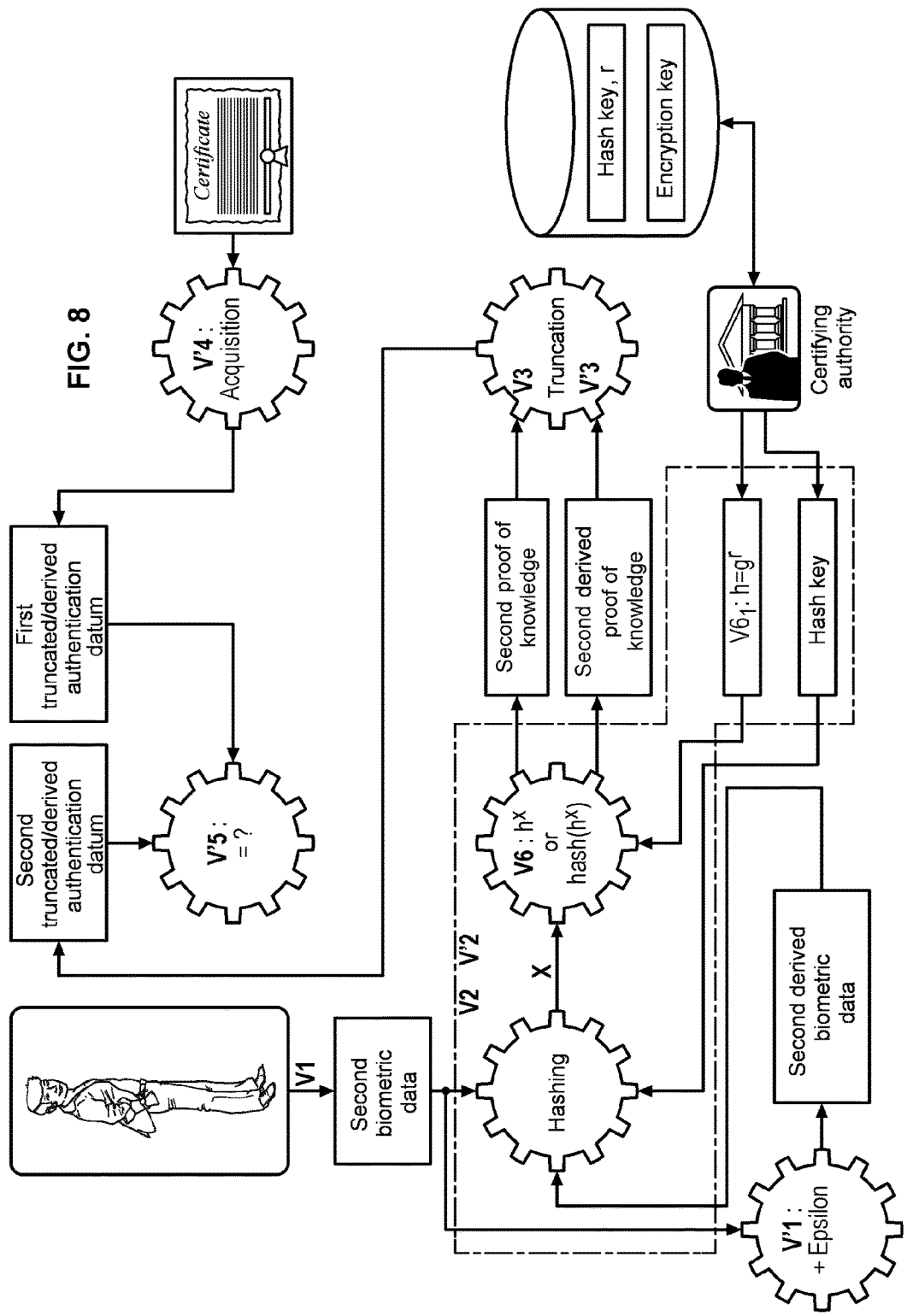
FIG. 8 is a diagram schematising a third embodiment of a method of authenticating a user holding a biometric certificate according to the invention.

In another embodiment illustrated FIG. 7 and FIG. 8, the first and second proofs of knowledge generated at the proof generation steps E2, E'2, V2 and V'2 can be obtained by calculating at calculation steps E6, V6 a modular exponentiation of a uniformly distributed value X obtained from the biometric data and from the pseudo-random function. The use of such a modular exponentiation to generate truncated authentication data before storage thereof prevents any fraudulent person from gaining easy access to the user's biometric data from the stored data.

More specifically, in this embodiment a derivation parameter h can be acquired by the data processing device 3 of the certifying authority 4 at a fifth acquisition step E61, V61. This derivation parameter can be obtained by performing a ^ exponentiation operation (e.g. on an elliptical curve or finite field) and by verifying the formula: $h=g^{\wedge}r$ where r is a random number, g a generator of a group of prime order p, and g and p being public data. From this derivation parameter h, that is optionally transmitted to the entity in charge of generating proofs of knowledge if this entity is not the certifying authority, the proof of knowledge can be calculated using the formula: $h^{\wedge}X$ or $hash(h^{\wedge}X)$ where X is a value obtained from said biometric data and from the pseudo-random function and hash is a hash function.

The random number r may optionally be dependent on user identity. This number can be held by the certifying authority 4 which may optionally provide this number to the entity in charge of generating proofs of knowledge.

Truncation

If it is estimated that no error has been generated, the length of the truncation may be 10 bits. As described above, such length allows the generating of 1024 vectors of proof of knowledge. It does not therefore allow the identifying of an individual among the population containing more than 1024 individuals but on the other hand it allows authentication of the individual with a false positive rate of 0.098%.

Otherwise, i.e. if at least one error is anticipated, then the chosen length of truncation n may depend on the determined number of errors to be tested E. The false positive probability is about $E/2^n$. The length of the truncation is then set so as to achieve the best possible compromise between the accepted rate of false collisions and the discriminating potential of the truncated authentication datum.

Should the errors to be tested be considered equiprobable, to obtain a probability of false collisions of about $1/1000$, the length of the truncation can be set at log 2 (1000*E), E being the number of tolerable errors. The upper integer value of log 2 (1000*E) can be chosen as truncation length to obtain a probability of false collisions of $1/1000$ or lower.

For example, if it is desired to take into account 16 types of errors which can be positioned on any pair of alleles among 10 pairs of alleles, i.e. E=160 errors to be taken into account, the truncation length can be 18. On the other hand, if the number of pairs of alleles is 23, i.e. E=230 errors to be taken into account, the truncation length may be 19.

Should the errors to be tested be considered non-equiprobable, the truncation length can be calculated by weighting the number of tolerable errors with their probability of occurrence. For example if the probability that no error will occur is 90%, that four types of errors may occur with a probability of 8% and the remaining errors (E-5) have a probability of occurrence of 2%, then to obtain a false collision probability of more or less $1/1000$, the truncation length n is log 2 (1000*(90%*1+8%*4+2%*(E-5))).

Therefore, if the number of pairs of alleles is 10 then the truncation length may be 12, and on the other hand if the number of pairs of alleles is 23 then the truncation length may be 13.

The invention claimed is:

1. A method of generating a biometric certificate of a user performed by a data processing device of a certifying authority, comprising:

acquiring biometric data of said user;
generating a proof of knowledge of said acquired biometric data from the acquired biometric data and a pseudo-random function;
generating a truncated authentication datum by applying a truncation function to said generated proof of knowledge;
generating a certificate for said user comprising data related to an identity of the user and the truncated authentication datum so that the certificate provides a proof of the user's identity and allows authenticating the user with a reduced rate of error while not allowing identification of the user,
wherein said method further comprises, for at least one error to be processed among a determined set of tolerable errors:
generating derived biometric data by adding said error to the acquired biometric data,
generating derived proofs of knowledge from the generated derived biometric data and from said pseudo-random function, and
generating derived truncated authentication data by applying said truncation function to said first generated derived proofs of knowledge.

2. The method of generating a biometric certificate according to claim 1, wherein the data processing device of the certifying authority holds a secret encryption key, and wherein generating the certificate for said user comprises encrypting the truncated authentication data of said user.

3. The method according to claim 1, wherein generating a proof of knowledge of biometric data comprises generating a hash of the biometric data performed by applying a hash function to the biometric data.

4. The method according to claim 3, wherein the proof of knowledge is generated using said hash function and a secret hash key stored solely by the certifying authority.

5. The method according to claim 1, wherein generating a proof of knowledge of biometric data comprises calculating a modular exponentiation of a uniformly distributed value obtained from the biometric data and from said pseudo-random function.

6. The method according to claim 5, wherein generating a proof of knowledge of biometric data further comprises steps of:
acquiring a derivation parameter h verifying the formula: $h = g\hat{\ }r$ where r is a random number, g a generator of a group of prime order p, and g and p being public data;
calculating the proof of knowledge using the formula: $h\hat{\ }X$ or $hash(h\hat{\ }X)$ with X being a value obtained from said biometric data and from said pseudo-random function, and hash being a hashing function.

7. The method according to claim 1, wherein the truncation function applies truncation over n bits, n being a function of the probability of occurrence of the tolerable errors.

8. The method of generating a biometric certificate according to claim 1, further including:
acquiring a truncated authentication datum or a derived truncated authentication datum stored in the certificate;
comparing the acquired truncated authentication datum or the derived truncated authentication datum with said generated truncated authentication datum,
said method further comprising:
for at least one tolerable error to be tested among a determined set of tolerable errors, generating derived biometric data by adding said error to the acquired biometric data;
for each error to be tested, generating a derived proof of knowledge from the generated derived biometric data and from said pseudo-random function, and a step of generating derived truncated authentication datum by applying said truncation function to said generated derived proof of knowledge;
acquiring a second truncated authentication datum or a derived truncated authentication datum obtained from said certificate;
comparing the second truncated authentication datum or the derived truncated authentication datum with the generated derived truncated authentication data.

9. A method of authenticating a user holding a biometric certificate generated comprising:
acquiring biometric data of said user to be authenticated;
generating a proof of knowledge of said acquired biometric data from the acquired biometric data and a pseudo-random function;
generating a truncated authentication datum by applying a truncation function to said generated proof of knowledge;
acquiring a truncated authentication datum or a derived truncated authentication datum stored in the certificate;
comparing the acquired truncated authentication datum or the derived truncated authentication datum with said generated truncated authentication datum,
said method further comprising:
for at least one tolerable error to be tested among a determined set of tolerable errors, generating derived biometric data by adding said error to the acquired biometric data;
for each error to be tested, generating a derived proof of knowledge from the generated derived biometric data and from said pseudo-random function, and a step of generating derived truncated authentication datum by applying said truncation function to said generated derived proof of knowledge;
acquiring a second truncated authentication datum or a derived truncated authentication datum obtained from said certificate;
comparing the second truncated authentication datum or the derived truncated authentication datum with the generated derived truncated authentication data.

10. The authentication method according to claim 9, wherein the data processing device of the certifying authority holds a secret encryption key, the certificate generating step for said user comprises an encryption step of the truncated authentication data of said user, and wherein acquiring the first truncated authentication datum comprises decrypting using the encryption key the first acquired encrypted truncated authentication datum.

11. A computer program product comprising program code instructions, stored on a non-transitory computer readable medium, to perform a method of generating a biometric certificate of a user by:
acquiring biometric data of said user;
generating a proof of knowledge of said acquired biometric data from the acquired biometric data and a pseudo-random function;
generating a truncated authentication datum by applying a truncation function to said generated proof of knowledge;
generating a certificate for said user comprising data related to an identity of the user and the truncated authentication datum so that the certificate provides a proof of the user's identity and allows authenticating the user with a reduced rate of error while not allowing identification of the user, wherein said method further comprises, for at least one error to be processed among a determined set of tolerable errors:

generating derived biometric data by adding said error to the acquired biometric data, generating derived proofs of knowledge from the generated derived biometric data and from said pseudo-random function, and generating derived truncated authentication data by applying said truncation function to said first generated derived proofs of knowledge.

12. A certification server comprising:

a processor and a memory storing instructions which when executed by the processor perform configured to perform a method of generating a biometric certificate of a user by:

acquiring biometric data of said user;

generating a proof of knowledge of said acquired biometric data from the acquired biometric data and a pseudo-random function;

generating a truncated authentication datum by applying a truncation function to said generated proof of knowledge;

generating a certificate for said user comprising data related to an identity of the user and the truncated authentication datum so that the certificate provides a proof of the user's identity and allows authenticating the user with a reduced rate of error while not allowing identification of the user, wherein said method further comprises, for at least one error to be processed among a determined set of tolerable errors:

generating derived biometric data by adding said error to the acquired biometric data, generating derived proofs of knowledge from the generated derived biometric data and from said pseudo-random function, and generating derived truncated authentication data by applying said truncation function to said first generated derived proofs of knowledge.

* * * * *